United States Patent
Lee et al.

(10) Patent No.: US 9,124,849 B2
(45) Date of Patent: Sep. 1, 2015

(54) PROGRAM-BASED ELECTRONIC PROGRAM GUIDE SYSTEM AND METHOD THEREOF

(75) Inventors: Dae-Hyun Lee, Seoul (KR);
Chang-Nam Chu, Yongin-si (KR);
Chun-Un Kang, Seoul (KR); Ki-Yong Kim, Seoul (KR); Seung-Hyuk Yu, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 874 days.

(21) Appl. No.: 12/252,738

(22) Filed: Oct. 16, 2008

(65) Prior Publication Data
US 2009/0165052 A1    Jun. 25, 2009

(30) Foreign Application Priority Data
Dec. 20, 2007 (KR) .................. 10-2007-0134517

(51) Int. Cl.
*H04N 5/455* (2006.01)
*H04N 5/445* (2011.01)
*H04N 21/482* (2011.01)

(52) U.S. Cl.
CPC ....... *H04N 5/44543* (2013.01); *H04N 21/4821* (2013.01); *H04N 21/4828* (2013.01)

(58) Field of Classification Search
USPC .................................................. 725/37–61
See application file for complete search history.

(56) References Cited

U.S. PATENT DOCUMENTS

| | | | |
|---|---|---|---|
| 5,629,733 A * | 5/1997 | Youman et al. ................. | 725/53 |
| 5,801,787 A * | 9/1998 | Schein et al. ................... | 725/43 |
| 6,966,064 B1 | 11/2005 | Schneidewend et al. | |
| 7,739,711 B2 * | 6/2010 | Finseth et al. ................... | 725/52 |
| 2002/0108113 A1 * | 8/2002 | Schaffer et al. ................. | 725/46 |
| 2004/0244038 A1 * | 12/2004 | Utsuki et al. .................... | 725/46 |
| 2006/0095937 A1 * | 5/2006 | Knudson et al. ................ | 725/45 |
| 2009/0055385 A1 * | 2/2009 | Jeon et al. ......................... | 707/5 |
| 2010/0205634 A1 * | 8/2010 | Knudson et al. ................ | 725/40 |
| 2012/0148217 A1 * | 6/2012 | Ellis et al. ..................... | 386/297 |

FOREIGN PATENT DOCUMENTS

| | | |
|---|---|---|
| KR | 10-2001-0013381 A | 2/2001 |
| KR | 2003283947 A | 10/2003 |
| KR | 10-2004-0082605 A | 9/2004 |
| KR | 1020060017223 A | 2/2006 |
| KR | 1020070002162 A | 1/2007 |
| KR | 10-2007-0077576 A | 7/2007 |
| WO | 2007/086674 A1 | 8/2007 |

OTHER PUBLICATIONS

Communication dated Jan. 27, 2014, issued by the Korean Intellectual Property Office in counterpart Korean Application No. 10-2007-0134517.

* cited by examiner

*Primary Examiner* — Nicholas Corbo
(74) *Attorney, Agent, or Firm* — Sughrue Mion, PLLC

(57) ABSTRACT

A program-based electronic program guide (EPG) system is provided, the EPG system including a search unit which searches for and finds programs broadcast within a predetermined time period around a predetermined time, a collection unit which collects program information of programs found by the search unit, a classification unit which classifies the program information collected by the collection unit based on program codes, and a display unit which displays program guide information, including the program information classified by the classification unit.

29 Claims, 5 Drawing Sheets

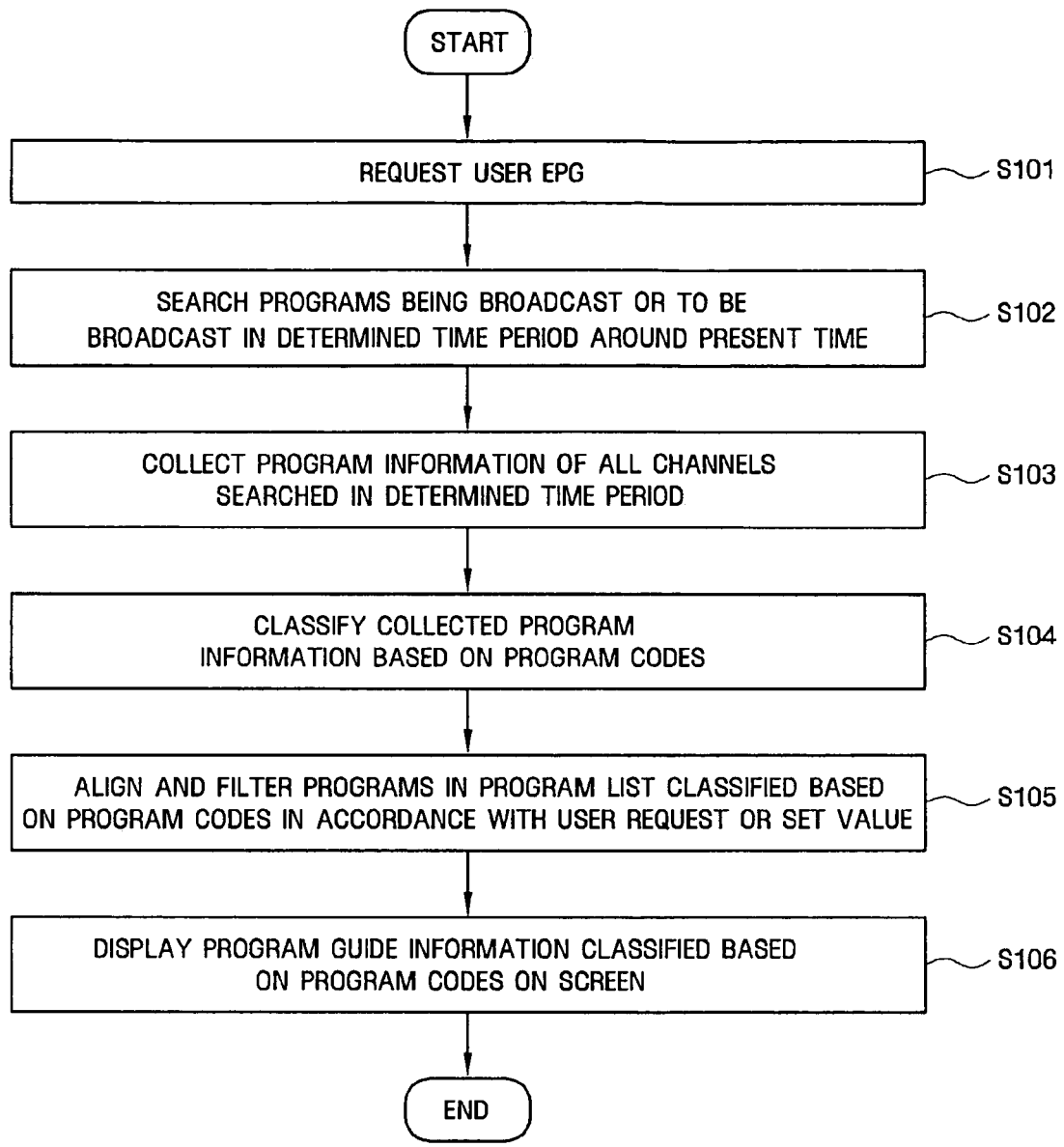

PROGRAM-BASED ELECTRONIC PROGRAM GUIDE SYSTEM AND METHOD THEREOF

CROSS-REFERENCE TO RELATED APPLICATION

This application is based on and claims priority from Korean Patent Application No 10-2007-0134517 filed on Dec. 20, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to an electronic program guide (EPG), and, more particularly, to a program-based EPG system and a method thereof, which enables a user rapidly and easily to select programs being broadcast through all channels by using program-based EPG information.

2. Description of the Related Art

In the past, the viewing of broadcasts was possible only through the use of antennas; however, diverse broadcasts can now be viewed through cables, satellites, and other means. Further, with the advent of Internet protocol television (IPTV), it is expected that the number of channels associated with web services will become very large.

Examples of related art channel-based EPGs in Korea include Mosaic EPG, Grid EPG, Skylife, Mini EPG, and Home Bar.

Mosaic EPG shows the content or still images of a channel currently being broadcast in the form of a thumbnail, and Grid EPG shows programs by channel and time zone using X-Y axes, in which the X-axis represents channel and Y-axis represents time. Skylife shows programs by channel and time zone in a Y-Y axis array, in which a left Y-axis shows channels and a right Y-axis shows a program list by time zone, to avoid infringing Grid EPG.

A related art channel-based EPG as described above and illustrated in FIG. 1, is a guide that primarily aligns channels on the Y-axis and secondarily aligns programs by time zone on the X-axis.

However, a related art channel-based EPG has a configuration that requires confirmation of a program by visiting the channel, and thus as the number of available channels is increased, the time required for a user to select a desired program also increases. That is, since more than 500 digital broadcasting channels are currently in service, and it is expected that the number of channels in service will become even greater with IPTV, a user will have to scan all channels in order to view a desired program. In addition, the same program may be broadcast through various channels in the same time zone. Accordingly, a program-based EPG system rather than a channel-based EPG system is required.

SUMMARY OF THE INVENTION

Accordingly, exemplary embodiments of the present invention may solve the above-mentioned problems occurring in the related art, and an object of exemplary embodiments the present invention is to provide a program-based EPG system and a method thereof, which enables a user to rapidly and easily select programs being broadcast through all channels by proving program-based EPG information rather than existing channel-based EPG information.

Additional advantages, objects, and features of the invention will be set forth in part in the description which follows and in part will become apparent to those having ordinary skill in the art upon examination of the following or may be learned from practice of the invention.

In order to accomplish these and other objects, an exemplary embodiment provides a program-based EPG system, which includes a search unit which searches for and finds programs being broadcast within a predetermined time period around a predetermined time; a collection unit which collects program information of programs found by the search unit; a classification unit which classifies the program information collected by the collection unit based on program codes; and a display unit which displays program guide information, including the program information classified by the classification unit, based on the program codes.

In another embodiment of the present invention, there is provided a method of displaying a program-based EPG, which includes: searching for and finding programs broadcast within a predetermined time period around a predetermined time; collecting program information of programs found by a search unit; classifying the program information collected by the collection unit based on program codes; and displaying program guide information, including the program information classified by the classification unit, based on the program codes.

BRIEF DESCRIPTION OF THE DRAWINGS

The above and other exemplary aspects and advantages of the present invention will be apparent from the following detailed description of exemplary embodiments taken in conjunction with the accompanying drawings, in which:

FIG. 5 is a flowchart illustrating a method of displaying a program-based EPG according to an exemplary embodiment of the present invention.

DETAILED DESCRIPTION OF EXEMPLARY EMBODIMENTS OF THE INVENTION

Figure 1:
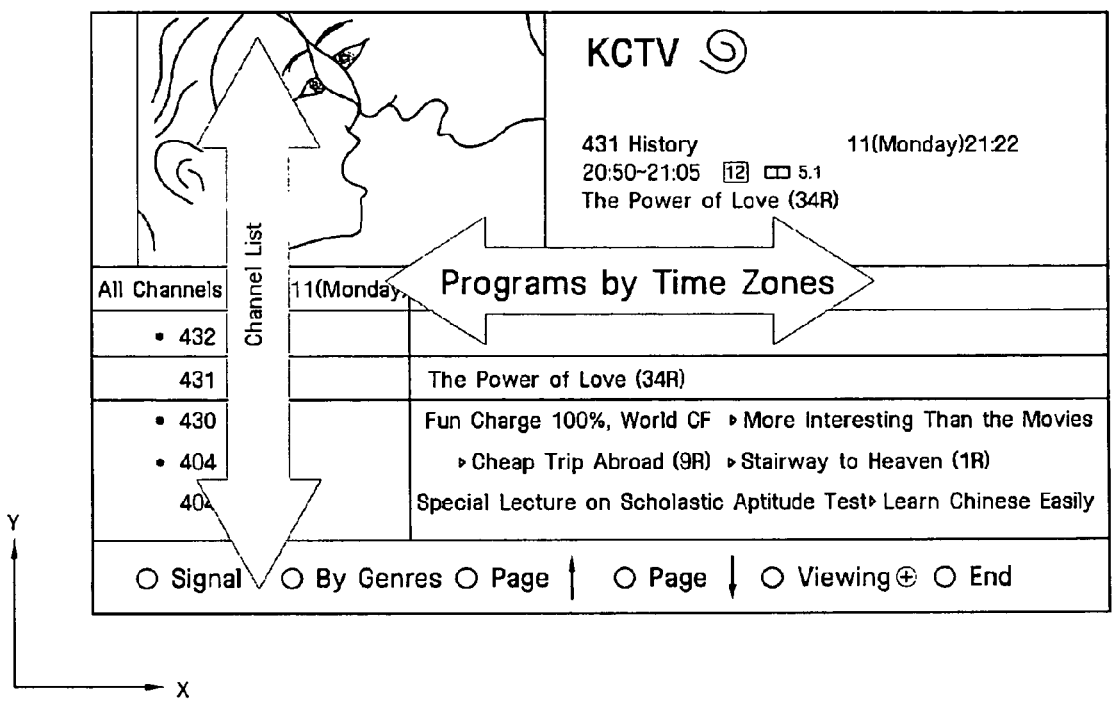
FIG. 1 is an exemplary view illustrating a related art channel-based EPG screen.

Hereinafter, exemplary embodiments of the present invention will be described in detail with reference to the accompanying drawings. The aspects and features of the present invention and methods for achieving the aspects and features will be apparent with reference to the exemplary embodiments. However, the present invention is not limited to the embodiments disclosed hereinafter, but can be implemented in diverse forms. The matters defined in the description, such as the detailed construction and elements, are nothing but exemplary details provided to assist those of ordinary skill in the art in a comprehensive understanding of the invention, and the present invention is only defined within the scope of the appended claims. In the entire description of the present invention, the same drawing reference numerals are used for the same elements throughout.

A program-based EPG system and a method thereof according to exemplary embodiments of the present invention will be described with reference to the accompanying drawings. For reference, in the following description, well-known processes, structures, and technologies are not described in detail since they would obscure the invention in unnecessary detail.

Figure 2:
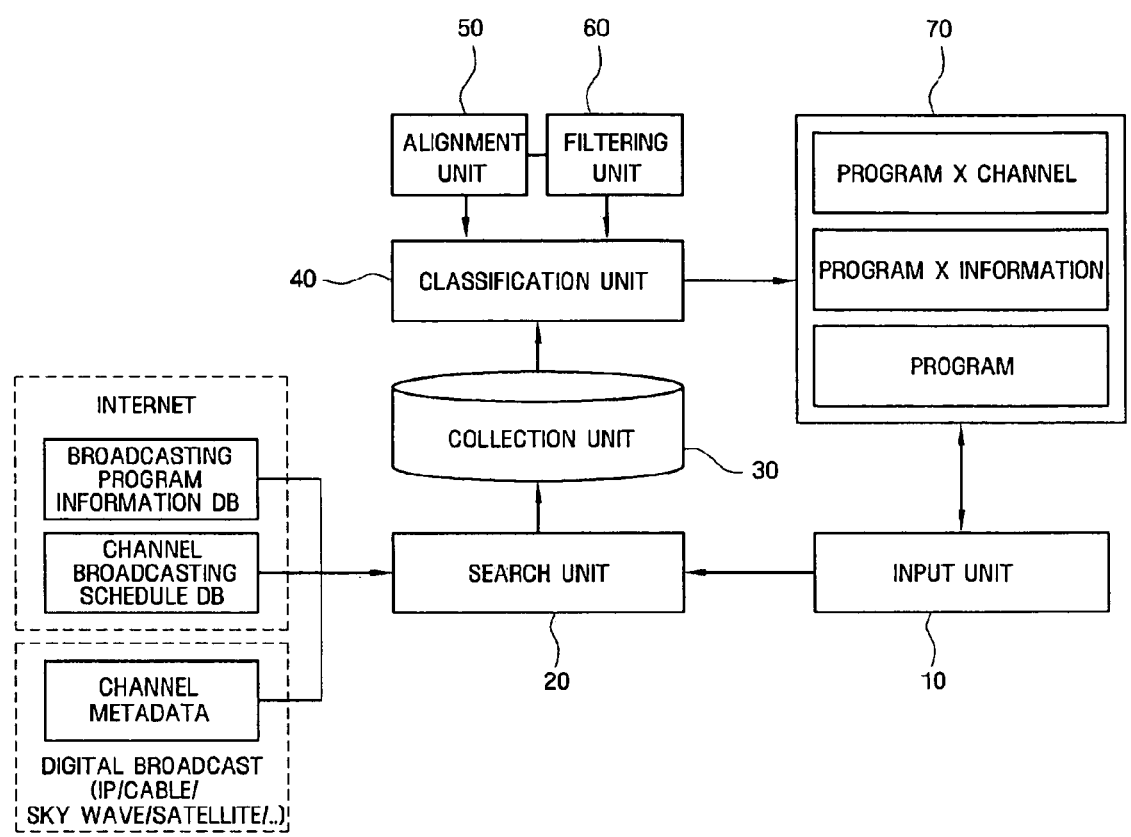
FIG. 2 is a block diagram illustrating a configuration of a program-based EPG system according to an exemplary embodiment of the present invention.
Figure 3:
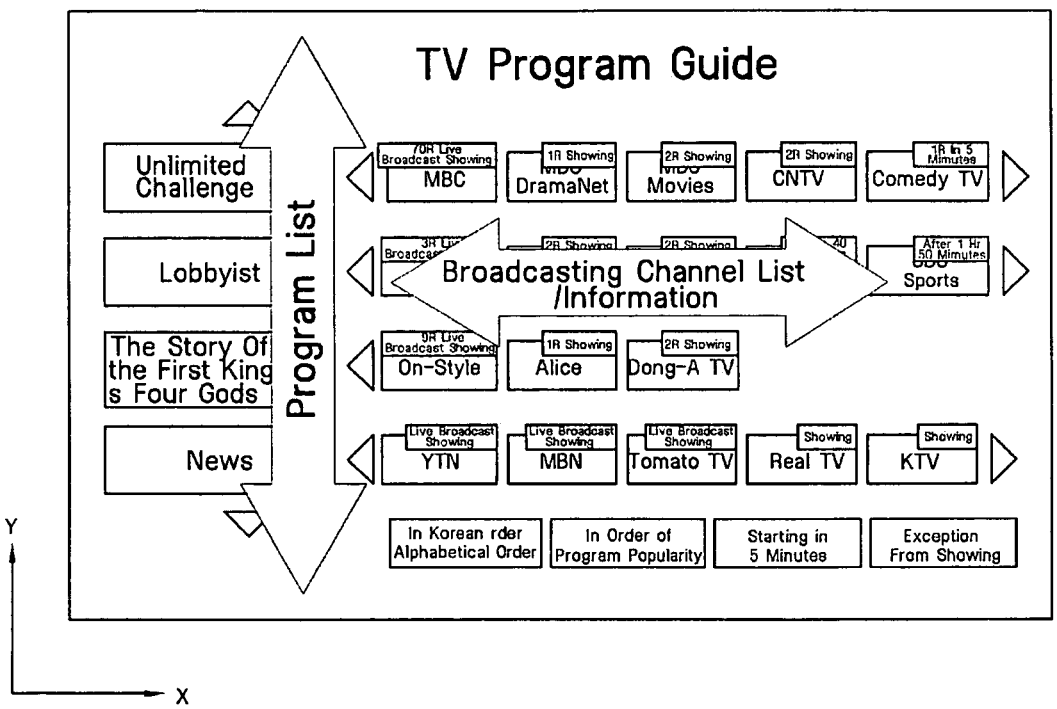
FIG. 3 is an exemplary view illustrating a program-based EPG basic screen according to an embodiment of the present invention.

FIG. 2 is a block diagram illustrating a configuration of a program-based EPG system according to an exemplary embodiment of the present invention. FIG. 3 is an exemplary view illustrating a program-based EPG basic screen according to an embodiment of the present invention, and FIG. 4 is an exemplary view illustrating a program-based EPG mini-screen according to an embodiment of the present invention.

Figure 4:
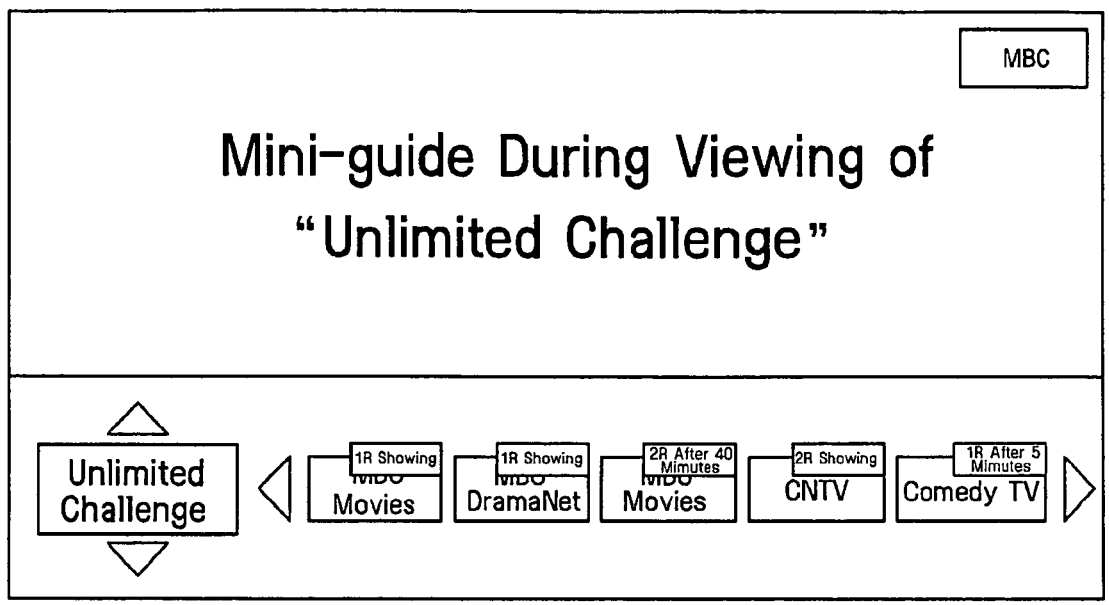
FIG. 4 is an exemplary view illustrating a program-based EPG mini-screen according to an embodiment of the present invention.

As illustrated in FIGS. 2 to 4, the program-based EPG system according to this embodiment includes an input unit 10, a search unit 20, a collection unit 30, a classification unit 40, an alignment unit 50, a filtering unit 60, and a display unit 70.

The input unit 10 receives various kinds of commands inputted by a user to request an EPG, and a command for inputting a time period designated by a user. For example, if the user inputs "an hour" as a designated time period through the input unit 10, the search unit 20 searches programs being broadcast or to be broadcast in an hour before and after the present time.

For all channels searched by the search unit 20 in a designated time period, the collection unit 30 collects program information from a server of a broadcasting program provider through the Internet or digital broadcasts. Specifically, for all channels available through the Internet or digital broadcasts, the collection unit 30 collects EPG information or individual program information, for example, program codes, cast, the number of times a program is broadcast, and so forth. Information collected through the Internet may include broadcasting program information, channel broadcasting schedules, and so forth, and information collected through digital broadcasts, such as IP, cable, sky-wave, and satellite digital broadcasts, may include channel metadata.

The classification unit 40 classifies the collected program information by categories based on program codes, for example, based on program titles.

The classification unit 40 classifies and indexes broadcasting channel lists by programs in a program list. That is, the classification unit 40 performs a program-based indexing/querying by adding the broadcasting channel lists to the respective programs in the program list.

The alignment unit 50 aligns the programs in the program list, in an order designated by the user. For example, the alignment unit 50 aligns the programs in the program list in Korean alphabetical order or in order of program popularity, i.e., in order of the number of broadcasting channels designated for the respective programs in the program list.

The filtering unit 60 performs filtering to pass programs desired by the user in the program list. For example, the filtering unit 60 performs filtering to pass only programs to be broadcast in a specified time in the program list, or only programs except for the program being currently broadcast.

That is, the alignment unit 50 and the filtering unit 60 perform the alignment and filtering, respectively, in accordance with a user's request or a set value, so that only useful information is displayed on a screen.

The display unit 70 displays program guide information, classified by the classification unit 40, based on the program codes.

The display unit 70 may display broadcasting channel lists for the respective programs in the program list. Specifically, the display unit 70 displays the program list on a Y-axis of the screen and displays the broadcasting channel lists for the respective programs in the program list on an X-axis of the screen. In addition, the display unit 70 may display specified ancillary information of the program for the corresponding broadcasting channel list. Ancillary information may include information on whether to broadcast live, whether to broadcast after the lapse of a specified time, whether a broadcast is in high definition (HD), the number of times a program is broadcast, the title of a program currently showing, and so forth.

Alternately, the display unit 70 may display specified ancillary information of the program for the corresponding broadcasting channel list, where ancillary information may include information on the number of channels being currently broadcast, cast, and so forth.

The display unit 70 may display only the program list.

In addition, the display unit 70 may display program guide information in the form of a mini-guide during viewing of a program. For example, as illustrated in FIG. 4, if a user requests an EPG mini-guide while viewing a program "Unlimited Challenge", broadcast channels related to the program "Unlimited Challenge" and ancillary information, such as information on whether to broadcast live, whether to broadcast after the lapse of a specified time, whether a broadcast is in the HD class, the number of times a program is broadcast, the title of a program currently showing, and so forth, are displayed in the form of a mini-guide.

That is, in the case of an EPG mini-guide, the display unit 70 displays an EPG while the user is viewing a program. For example, the display unit 70 may display broadcast channels related to the specified program on an EPG basic screen as illustrated in FIG. 3, or may filter the same program information in the same time zone and output only other programs in the program list.

Hereinafter, with reference to FIG. 5, a method of displaying a program-based EPG according to an embodiment of the present invention will be described in detail.

FIG. 5 is a flowchart illustrating a method of displaying a program-based EPG according to an exemplary embodiment of the present invention.

As illustrated in FIG. 5, if a user requests an EPG by inputting a designated time period through the input unit 10 (S101), the search unit 20 searches programs being broadcast or to be broadcast in the designated time period (S102). For example, if the user inputs "an hour" as the designated time period through the input unit 10, the search unit 20 searches programs being broadcast or to be broadcast in an hour before and after the present time.

Then, the collection unit 30 collects program information of all channels in the designated time period from the Internet or from digital broadcasting information (S103). For example, the collection unit 30 may collect EPG information of programs of all channels, or individual program information, such as program codes, cast, the number of times a program is broadcast, and so forth, through the Internet or through digital broadcasts, such as IPTV, cable, sky-wave, and satellite broadcasts.

Then, the classification unit 40 clusters all the program information collected by the collection unit 30 by classifying the program information based on program codes, for example, based on program titles, and indexes the corresponding broadcasting channel lists for the programs and various kinds of ancillary information (S104).

At this time, the program lists classified based on the program codes are aligned and filtered in accordance with a user's request or a set value (S105).

Specifically, the programs in the program list, which are classified by the classification unit 40 based on the program codes, are aligned by the alignment unit 50 in an order designated by the user. For example, the alignment unit 50 aligns the programs in the program list in Korean alphabetical order or in order of program popularity, i.e., in order of the number of broadcasting channels designated for the respective programs in the program list.

The filtering unit 60 performs filtering to pass programs desired by the user in the program list. For example, if the user intends to view only programs that start at a specified time, for example, in five minutes, in the program list, or only programs except for the program being currently broadcast, the filtering unit 60 performs filtering to pass only program information useful to the user.

Last, the display unit 70 displays program guide information, classified by the classification unit 40, based on the program codes (S106). At this time, the display unit displays the broadcasting channel lists corresponding to the programs in the program list and specified ancillary information of the corresponding programs.

For example, the display unit 70 displays the program list on the Y-axis of the screen and displays the broadcasting channel lists for the respective programs in the program list on the X-axis of the screen. In addition, the display unit 70 may display specified ancillary information of the program for the corresponding broadcasting channel list, which may include information on whether to broadcast live, whether to broadcast after the lapse of a specified time, whether the broadcast is in the HD class, the number of times the program is broadcast, the title of the program currently showing, and so forth.

In addition, the display unit 70 may display the program guide information in the form of a mini-guide during the viewing of a program, so that the user can view the broadcast channels related to the corresponding program and the ancillary information, such as information on whether to broadcast live, whether to broadcast after the lapse of a specified time, whether the broadcast is in the HD class, the number of times the program is broadcast, the title of the program currently showing, and so forth, in the form of a mini-guide.

The EPG information may be updated in accordance with a user's input or through repetition of the program information collection performed by the collection unit at predetermined intervals.

Accordingly, the program-based EPG system according to exemplary embodiments of the present invention can be used as a next-generation EPG system that can be applied to IPTV and so on, in which the number of channels in service is infinite, and can provide a content-oriented program guide so that a user can select a desired program rapidly and easily.

For example, in a case where a live broadcast of "Unlimited Challenge" of MBC comes to an end and the rebroadcast thereof starts immediately through MBC DramaNet, a user who did not view the live broadcast "Unlimited Challenge" can directly recognize information on the rebroadcast of "Unlimited Challenge" of MBC DramaNet through the "Unlimited Challenge" guide being displayed. The user can then view the rebroadcast, rather than viewing only the ending of the live broadcast of "Unlimited Challenge" of MBC.

As described above, according to the program-based EPG system and the method thereof according to exemplary embodiments of the present invention, program-based EPG information, rather than existing channel-based EPG information, is provided, and thus a user can rapidly and easily select programs being broadcast through all channels in a proper time period.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A program-based electronic program guide (EPG) system comprising:
   a processor which is configured to search for programs to be broadcast through various channels around a time required for a user; and
   a display which displays together the searched programs and channel lists on a first screen portion and a second screen portion, respectively,
   wherein
   the display displays broadcast channels of a channel list corresponding to a respective program along one row corresponding to the respective program,
   the displayed broadcast channels are separated according to multiple broadcasting channel providers and include an ancillary information of the respective program to be broadcast on each broadcast channel,
   the ancillary information includes an information processed based on a current time,
   the searched programs are aligned on the first screen portion in a column direction in an N×1 array,
   the channel lists corresponding to each of the searched programs are aligned on the second screen portion in rows in an N×M array, each row corresponding to each of the searched programs,
   the N is a number of the searched programs,
   the M is a number of the broadcast channels separately displayed in each of respective rows, in correspondence to the multiple broadcasting channel providers, and
   each of the N and M is a natural number greater than 1.

2. The EPG system of claim 1, wherein the processor is further configured to:
   collect program information corresponding to the programs found by the searching which are being broadcast or to be broadcast through the channels; and
   classify the program information into a plurality of categories.

3. The EPG system of claim 2, wherein the program information is classified into the plurality of categories based on program titles.

4. The EPG system of claim 2, wherein the processor is further configured to classify and index the channel lists corresponding to the plurality of categories in a program list.

5. The EPG system of claim 2, wherein the program information is collected through at least one of Internet and digital broadcasts.

6. The EPG system of claim 1, wherein the display displays a program list on a Y-axis of the first screen portion, and
   displays the channel lists on an X-axis of the second screen portion.

7. The EPG system of claim 1, wherein the ancillary information comprises at least one of:
   information on whether to broadcast live,
   information on whether to broadcast after the lapse of a specified time,
   information on whether a broadcast is in high definition, and
   the number of times a program is broadcast.

8. The EPG system of claim 7, wherein the ancillary information further includes a title of a program currently showing.

9. The EPG system of claim 1, wherein the display further displays information on a number of broadcast channels being currently broadcast for the respective program.

10. The EPG system of claim 1, wherein the processor is further configured to align the searched programs in a program list, in an order designated by the user.

11. The EPG system of claim 10, wherein the searched programs are aligned in an alphabetical order.

12. The EPG system of claim 10, wherein the searched programs are aligned in the order of a number of channels which broadcast a respective program and are displayed in the program list.

13. The EPG system of claim 10, wherein the processor is further configured to filter the searched programs in the program list to remove programs not desired by the user.

14. The EPG system of claim 13, wherein the searched programs are filtered to remove programs which are not broadcast within a specified time.

15. The EPG system of claim 13, wherein the searched programs are filtered to remove a program being currently broadcast.

16. The EPG system of claim 1, wherein a time period for the searching is input by the user.

17. The EPG system of claim 1, wherein the display separately displays each broadcast channel of the channel list together with the ancillary information corresponding to the respective program next to one another as one broadcast channel per a screen area, in the one row, according to a broadcast time.

18. The EPG system of claim 1, wherein the displayed ancillary information displays information on whether the broadcast channel is broadcasting live or rebroadcasting.

19. The EPG system of claim 1, wherein the display separately displays each broadcast channel of the channel list on a separate area, and
the ancillary information is displayed on a corresponding area of each broadcast channel.

20. A method of displaying a program-based electronic program guide, the method comprising:
searching for programs to be broadcast through various channels around a time required for a user; and
displaying the searched programs and channel lists on a first screen portion and a second screen portion, respectively, while displaying the searched programs and the channel lists together,
wherein
the displaying comprises displaying broadcast channels of a channel list corresponding to a respective program along one row corresponding to the respective program,
the displayed broadcast channels are separated according to multiple broadcasting channel providers and include an ancillary information of the respective program to be broadcast on each broadcast channel,
the ancillary information includes an information processed based on a current time,
the searched programs are aligned on the first screen portion in a column direction in an N×1 array,
the channel lists corresponding to each of the searched programs are aligned on the second screen portion in rows in an N×M array, each row corresponding to each of the searched programs,
the N is a number of the searched programs,
the M is a number of the broadcast channels separately displayed in each of respective rows, in correspondence to the multiple broadcasting channel providers, and
each of the N and M is a natural number greater than 1.

21. The method of claim 20, further comprising:
collecting program information corresponding to the programs being broadcast or to be broadcast through the channels by collecting the program information through one or more of the Internet and digital broadcasts.

22. The method of claim 20, wherein the displaying comprises displaying the channel lists in a program list, and
displaying specified ancillary information of at least one of the programs in at least one of the displayed channel lists.

23. The method of claim 20, further comprising aligning the searched programs in a program list in an order designated by the user.

24. The method of claim 23, wherein the aligning the searched programs in the program list comprises one of:
aligning the searched programs in the program list in an alphabetical order; and
aligning the searched programs in the program list in the order of a number of channels which broadcast a respective program and are displayed in the program list.

25. The method of claim 23, further comprising filtering the searched programs in the program list to remove programs not desired by the user.

26. The method of claim 25, wherein filtering the searched programs comprises at least one of:
removing all programs not broadcast in a specified time period; and
removing a program being currently broadcast.

27. The method of claim 20, wherein a time period for the searching is input by the user.

28. The method of claim 20, wherein the ancillary information includes at least one of information on whether to broadcast live, whether to broadcast after a lapse of a specified time, whether a broadcast is in a high-definition (HD) class, and a number of times a program is broadcast.

29. The method of claim 28, wherein the ancillary information further includes a title of a program currently showing.

* * * * *